US007870239B1

(12) United States Patent
Kaufman et al.

(10) Patent No.: US 7,870,239 B1
(45) Date of Patent: Jan. 11, 2011

(54) METHOD AND SYSTEM FOR SECURING NETWORK ACCESS TO DYNAMICALLY UPDATEABLE DATA STORED IN A DATA STORAGE SYSTEM

(75) Inventors: Mark Kaufman, Newton, MA (US); Uresh K. Vahalia, Newton, MA (US); Percy Tzelnic, Concord, MA (US); Steven M. Blumenau, Holliston, MA (US); John T. Fitzgerald, Mansfield, MA (US); Erez Ofer, Chestnut Hill, MA (US); James M. McGillis, Franklin, MA (US); Mark C. Lippitt, Westborough, MA (US); Natan Vishlitzky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 867 days.

(21) Appl. No.: 10/113,307

(22) Filed: Mar. 29, 2002

Related U.S. Application Data (63) Continuation-in-part of application No. 09/261,621, filed on Mar. 3, 1999, and a continuation-in-part of application No. 09/107,618, filed on Jun. 30, 1998.

(51) Int. Cl.
*G06F 15/173* (2006.01)
*G06F 13/28* (2006.01)
*G06F 15/16* (2006.01)
*G06F 13/00* (2006.01)
*G06F 17/30* (2006.01)

(52) U.S. Cl. .............. 709/223; 711/152; 711/148; 726/4; 709/225; 707/200; 707/201; 707/10

(58) Field of Classification Search ............. 709/223, 709/201, 203, 217, 219, 245, 246, 225; 710/1, 710/3, 5; 711/100, 148, 152; 726/4; 707/200, 707/201, 10
See application file for complete search history.

(56) References Cited

U.S. PATENT DOCUMENTS

| | | | | |
|---|---|---|---|---|
| 5,729,734 | A * | 3/1998 | Parker et al. ................... 707/9 |
| 5,940,838 | A * | 8/1999 | Schmuck et al. ............ 707/200 |
| 5,974,424 | A * | 10/1999 | Schmuck et al. ............ 707/201 |
| 6,023,706 | A * | 2/2000 | Schmuck et al. ............ 707/200 |
| 6,032,216 | A * | 2/2000 | Schmuck et al. ............ 710/200 |
| 6,122,740 | A * | 9/2000 | Andersen ....................... 726/4 |
| 6,134,658 | A * | 10/2000 | Multerer et al. ............. 713/175 |
| 6,219,652 | B1 * | 4/2001 | Carter et al. ................... 705/59 |

(Continued)

OTHER PUBLICATIONS

Rodney Van Meter, et al, "Task Force on Network Storage Architecture: Internet-Attached Storage Devices", System Science, 1997, v.1, p. 726 (IEEE).

(Continued)

*Primary Examiner*—Philip C Lee
(74) *Attorney, Agent, or Firm*—Krishnendu Gupta; Joseph D'Angelo (57) ABSTRACT

This invention is a system and method for managing data in a secure manner in a data storage environment that is in communication with a network including an internet-based network. The system includes logic for securely managing internet client's access to data volumes stored on a data storage system, and may also include logic operating with a file server for providing dynamic access of data available to such clients in a secure fashion.

25 Claims, 4 Drawing Sheets

U.S. PATENT DOCUMENTS

| | | | |
|---|---|---|---|
| 6,546,471 B1 * | 4/2003 | Tarui et al. | 711/148 |
| 6,615,258 B1 * | 9/2003 | Barry et al. | 709/223 |
| 6,658,417 B1 * | 12/2003 | Stakutis et al. | 707/10 |
| 6,697,846 B1 * | 2/2004 | Soltis | 709/217 |
| 6,714,979 B1 * | 3/2004 | Brandt et al. | 709/225 |
| 6,728,844 B2 * | 4/2004 | Sanada et al. | 711/152 |
| 6,757,710 B2 * | 6/2004 | Reed | 709/203 |
| 2002/0095454 A1 * | 7/2002 | Reed et al. | 709/201 |
| 2004/0064692 A1 * | 4/2004 | Kahn et al. | 713/167 |
| 2004/0133570 A1 * | 7/2004 | Soltis | 707/3 |

OTHER PUBLICATIONS

Garth A. Gibson, et al, "File Server Scaling With Network-Attached Secure Disks", SIGMETRICS 1997, pp. 272-284 (ACM).

* cited by examiner

METHOD AND SYSTEM FOR SECURING NETWORK ACCESS TO DYNAMICALLY UPDATEABLE DATA STORED IN A DATA STORAGE SYSTEM

CROSS REFERENCE TO RELATED APPLICATIONS

This application is a continuation-in-part of co-pending U.S. patent application Ser. No. 09/107,618 by Blumenau et al., filed Jun. 30, 1998, and also is a continuation-in-part of co-pending U.S. patent application Ser. No. 09/261,621 by Vahalia et al., filed Mar. 3, 1999 and that is assigned to the same assignee as this invention. Priority is hereby claimed under 35 USC 120 from the filing date of each of these co-pending patent applications, each of which is hereby incorporated by reference.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to handling of data in a data storage environment, and more particularly to a system and method for securing access to data stored in a data storage system when such data is to be made available to networked users, including users on the internet.

BACKGROUND OF THE INVENTION

Commerce on the internet continues to grow at astounding speed and is already in the tens of billions of dollars on a global basis. Unfortunately, security concerns are replete because along with easy fast access to data on a global basis comes the threats from computer hackers including criminals, vandals, and others with potentially harmful motives.

The System Administration, Networking, and Security (SANS) Institute, an American non-profit organization for cooperative research and education draws on experts from academia and government agencies such as the National Security Agency (NAS) and the Federal Bureau of Investigation (FBI). Web threats are highlighted in "The Twenty Most Critical Internet Security Vulnerabilities The Experts' Consensus" Version 2.502 Jan. 30, 2002 published on the SANS website (www.sans.org)

Despite the listed vulnerabilities having been well known they had not been fixed because there were so many other vulnerabilities and system administrators were so busy it seemed overwhelming to figure out which were the most important. Opportunists exploiting paths of least resistance have targeted the same so-called "holes," time after time, thus leading to the SANS list. According to SANS, system compromises in a recent Pentagon hacking incident and the easy and rapid spread of the year 2001 Code Red and NIMDA worms were traceable to vulnerabilities in the top twenty list.

The vulnerabilities listed in a prioritized list format by SANS were grouped into the following categories: (1) General; (2) Microsoft Windows operating system-based; and (3) Unix operating system based. The General category includes such issues as failure to require passwords or stolen passwords and system ports vulnerable to intrusion by hackers while the other two categories detail problems with existing dominating operating systems that operate on servers and clients in networked environments including, of course, the internet network.

The vulnerability of data that is exposed to network intrusion will remain are serious problem as long as these and other vulnerabilities can be exploited to get to data which is too easily accessible on the internet. What is needed is a security based solution that does not prohibitively slow down legitimate access to data. After all if the data is to hard to get to by users on the internet the growth and popularity will be inhibited and internet commerce itself and global economies in turn will suffer/

SUMMARY OF THE INVENTION

In order to solve the problems of the prior art referenced above, the present invention is a system and method for securing access to data that is available for access by networked users and applications, including such that are internet-based. The system includes logic for securely managing internet client's access to data volumes stored on a data storage system, and may also include logic operating with a file server for providing dynamic access of data available to such client's in a secure fashion.

The method includes operation of computer-executable logic with such a system for protecting such data on a data storage system including secure data volume access. In an alternative embodiment of the method the protected data may be updateable on a dynamic basis by providing a file server with a file system separate from host or clients that may request the data and such data may be further protected on a volume basis on a data storage system.

In another alternative embodiment, the invention includes a system for carrying out embodiments of the methods described above. In another alternative embodiment, the invention includes a program product for carrying out embodiments of the method steps. In still another alternative embodiment the invention includes an apparatus enabled to carry out embodiments of the method steps.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The method, apparatus, and system of the present invention are each intended for use with data storage systems, such as the Symmetrix Integrated Cache Disk Array system available from EMC Corporation of Hopkinton, Mass., but are not limited to such a system.

Figure 1:
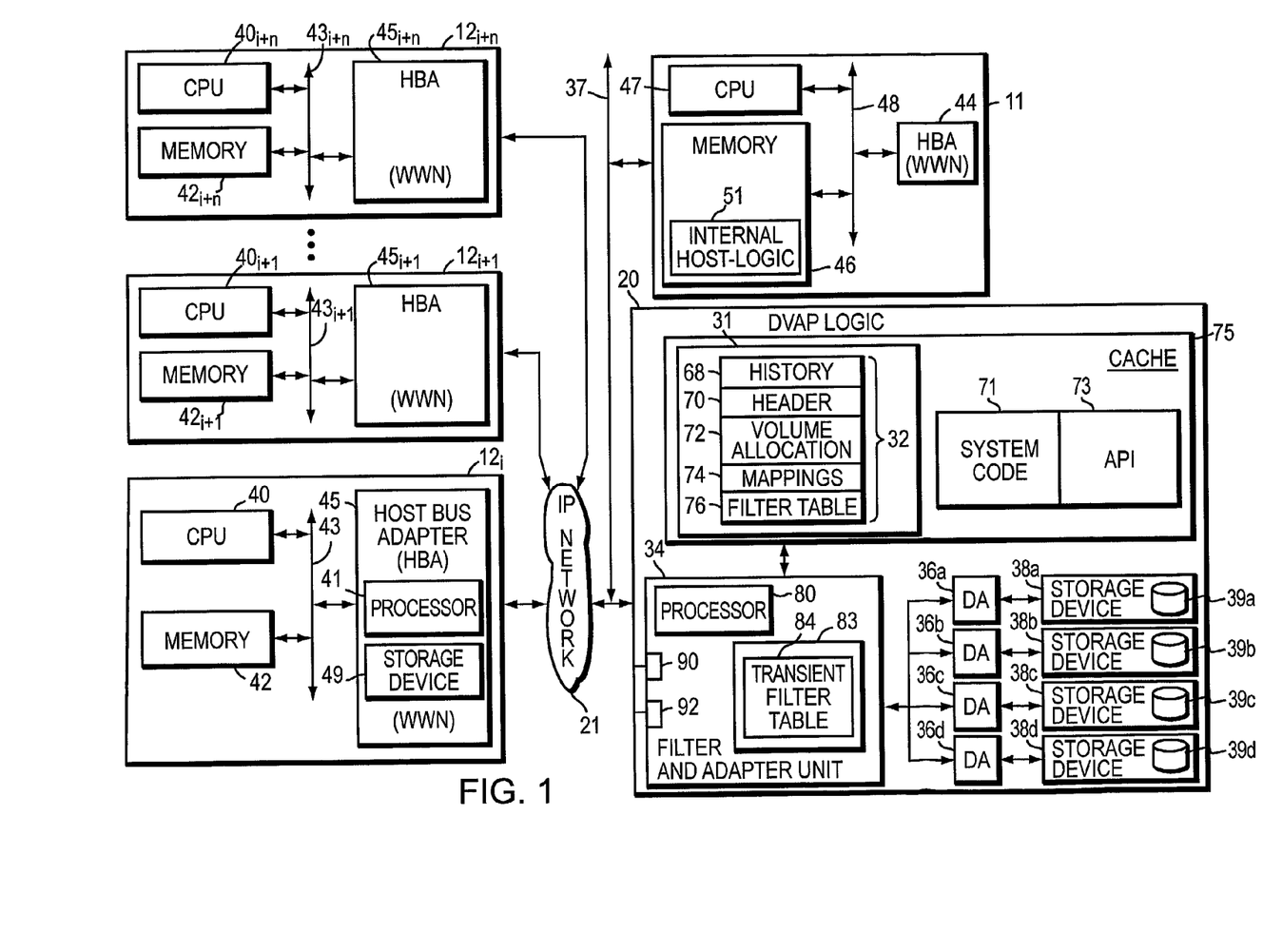
FIG. 1 is a block diagram of an external network of computers, which may access a data storage network including a data storage system, at least one host computer system and wherein the external network may operate in accordance with an internet protocol, and also including logic for enabling operation of the present invention.
Figure 3:
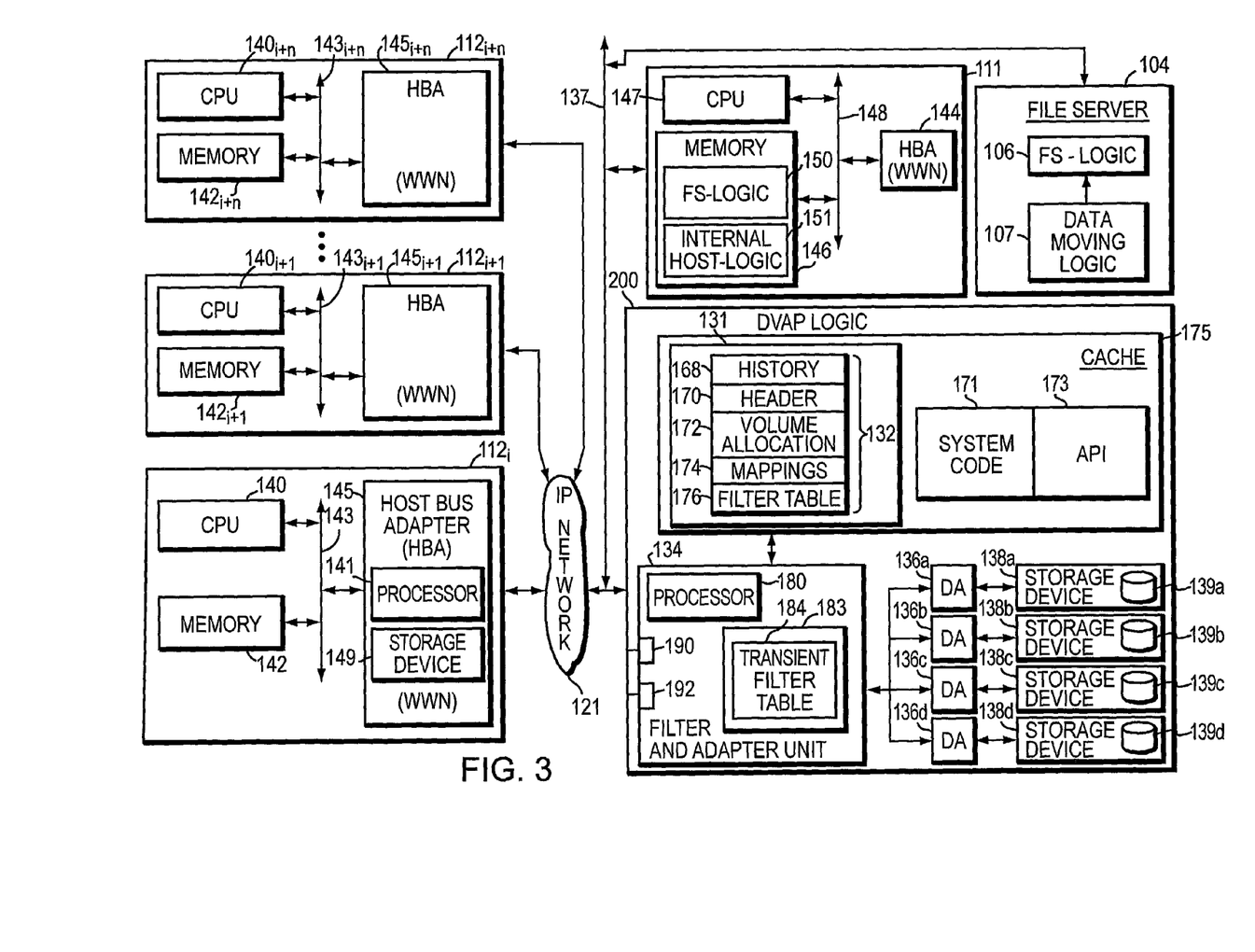
FIG. 3 is a block diagram of an external network of computers, which may access a data storage network including a data storage system, a file server, and at least one host computer system and wherein the external network may operate in accordance with an internet protocol, and also including logic for enabling operation of the present invention.

The method, system, and apparatus of this invention may take the form, at least partially, of program code (i.e., instructions) embodied in tangible media, such as floppy diskettes, CD-ROMs, hard drives, random access or read only-memory, or any other machine-readable medium, including transmission lines. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. Computer-executable Logic for carrying out operation of the system shown in FIGS. 1 and 3 is embodied preferably as software. The Logic collectively comprises various components shown in these Figures.

In a preferred embodiment data security is provided by employing Data Volume Access and Protection (DVAP) Logic 31 (described with reference to FIG. 1 below), which in a preferred embodiment is EMC's Volume Logix software available from EMC of Hopkinton, Mass. and with certain improvements described herein. EMC's Volume Logix software is generally described in detail in U.S. Pat. No. 6,141,707 by Halligan and Ofer, issued Oct. 31, 2000 and U.S. patent application Ser. No. 09/107,618 by Blumenau of which this application is a continuation-in-part, each assigned to the assignee of this invention and each is hereby incorporated by reference in its respective entirety. The Logic 31 in Storage System memory 75 acts in cooperation with Internal Host Logic 51 in computer memory 46 (FIG. 1) for carrying out access, but critical portions of the Logic including a database are kept in the Data Storage System safe from access by intruders.

Volume Logix has been used in a high-speed but local environment, typically employing Fibre Channel. Multi-node Fibre channel using a hub or switch allowed multiple hosts sharing a data port to access all Data Volumes configured to the fibre adapter. For the purposes of this application, volumes can refer to physical volumes, although logical volumes are preferred. The term "Data Volumes," in a preferred environment refers to logical Data Volumes 39a-39d that comprises physical data stored on one or more of the Storage Devices 38a-38d (see FIG. 1 described in more detail below). One skilled in the art will recognize that the logical data could be spread over only one or several physical storage devices.

Volume Logix has been created to address the problem created by allowing multiple hosts sharing a data port having a plurality of Data Volumes assigned to it. The Volume Logix system allows only hosts with the proper access permissions to get access to protected volumes. A Volume Logix database may contain entries for a maximum number of access ports and each port can support a certain number of connections to host HBA's, each with a unique worldwide name (WWN).

Referring to FIG. 1, in the present invention, the DVAP Logic 31 includes a database 32, preferably similar in structure to the Volume Logix Database. The database 32 is copied to the Data Storage System's Cache Memory 75. Once initialized it is write protected to prevent unauthorized or inadvertent erasure. A login Filter Table 76 (shown in detail in FIG. 2) contains a history of the HBA's identified by WWN that have access to the Data Volumes and their current status.

Further, the DVAP Logic 31 may employ encrypted keys with the table to authenticate that the HBA represented, as the HBA having access is truly the HBA as described in the incorporated application Ser. No. 09/107,618.

Figure 2:
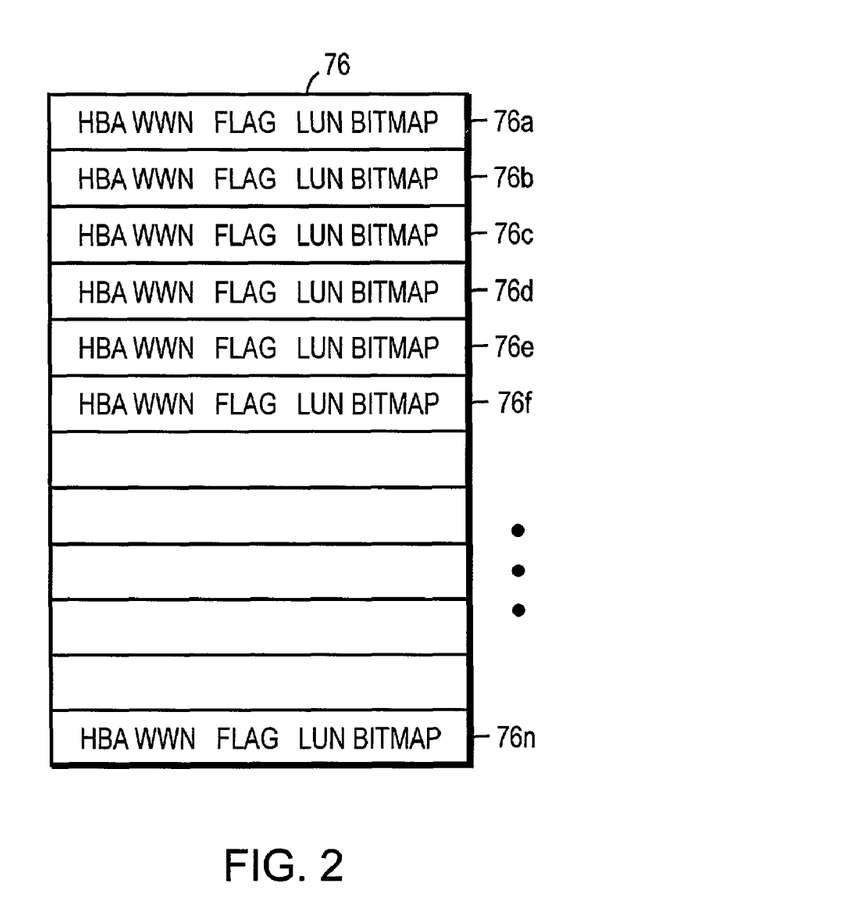
FIG. 2 is a schematic of an access table for enforcing security measures on data volumes accessible to the host computer systems on the data storage system of FIG. 1.

Exemplary components of a host and storage system that may be used to implement the method an apparatus for filtering requests based on a host identifier will now be further described with regard to FIGS. 1-2. FIG. 1 illustrates a host computer $12_i$ coupled to a storage system 20 via network 21, which in a preferred embodiment operates in accordance with the well-known internet protocol (IP). The host computer $12_i$ may act as an external host for a multitude of other hosts $12_{i+1}$-$12_{i+n}$, which in effect may be clients for host $12_i$. Data that host computer 12 may access for these clients is protected on Data Storage System 20 in a manner described in detail below. Such protection may include limiting access by the host computer 12 to a read-only designated port, such as port 90 or 92 via DVAP Logic 31.

Storage system 20 is in a preferred embodiment a Symmetrix Integrated Cache Disk Array available from EMC Corporation of Hopkinton, Mass. Such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems Using the preferred Symmetrix Integrated Cache Disk Array system available from EMC Corporation of Hopkinton, Mass. as the Data Storage System, the DVAP Logic 31 communicates with system code 71 preferably configured as microcode that communicates with the known Symmetrix API 73 that includes specifications for communicating therewith and which are available from EMC. The system code is preferably configured to allow access permissions to be allocated for each host to have access for each data volume, such as on a read-only or read-write basis. Acting in cooperation with the microcode through the API, the DVAP Logic 31 and its cooperative Host-Logic 51 preferably allow host users to configure permissions on their allocated volumes.

Generally speaking, the data storage system 20 operates in response to commands from one or more computer or host systems, such as internally located host system 11 on internal network 37, which, preferably is a Fibre Channel network, and indirectly to externally located host systems $12_i$-$2_{i+n}$, on internet network 21 connected via a host bus adapter (HBA) like HBA 45 that includes a processor 41 and its own storage device 49. For internally located host 11 the HBA 44 is shown in simple form but like the HBA $45_{i+1}$-$45_{-i+n}$ includes such similar components to HBA 45. The disk adapters 36a-36d respond directly to the HBA-initiated instructions by effecting a corresponding operation, such as a read operation. Reading operations transfer data from the storage devices 38a-38d to the system memory 75 through a corresponding disk adapter and subsequently transfer data from the system memory when a host system initiates a data writing operation.

HBA's $45_n$-$45a_n$ of computers $12_{i+n}$ are also similarly configured as those of computer $12_i$ but are shown without all detail for the sake of simplicity.

The host computer systems 11 and $12_i$-$12_{i+n}$ may be any conventional computing system, each having an operating system, such as a system available from Sun Microsystems, and running the Solaris operating system (a version of Unix), an HP system running HP-UX (a Hewlett-Packard client, running a Hewlett-Packard version of the Unix operating system) or an IBM system running the AIX operating system (an IBM version of Unix) or any other system with an associated operating system such as the Microsoft WINDOWS NT or WINDOWS 2000 operating system. Each computer system 11 and $12_i$-$12_{i+n}$ includes a CPU 47 or $40_i$-$40_{i+n}$, respectively, and memory 46 or $42i$-$42_{i+n}$, respectively. The internal and external host computers each include a respective local bus 48 or $43_i$-$43_{i+n}$ for coupling its respective memory and CPU. Also, one or more host bus adapters (HBA's) 44, and $45_i$-$45_{i+n}$ are coupled between the respective bus and the network 21, which in a preferred embodiment operate in accordance with the internet protocol (IP). Each host bus adapter operates to connect the respective host computer to the network. (Computer 12 is also coupled to network 21 though internal network 37). The HBA's translate data received from the respective CPU into the format dictated by the protocol of the network, i.e. in a preferred embodiment the IP. In addition, the HBA's translate data received from the network in packet format into data in a format usable by the CPU. The internal Host 11 generally operates as the externally located Hosts, but is configured with specific Logic for carrying out the specific operation of this invention.

Each host bus adapter may be implemented using a combination of hardware resident on the HBA and driver software stored in the HBA or in the respective computer memory. Alternatively, the host bus adapter may be implemented either entirely in hardware or software. In one embodiment, as briefly mentioned above, each HBA itself includes a processor, such as processor 41 coupled to an internal storage device, such as device 49. The processor 41 controls the flow and format of data into and out of the HBA 45. In this example, the memory 49 is used to provide temporary storage of data as it is transferred to and from the network.

The storage system 20 includes storage devices 38a-38d, which may include one or more disk devices. Access to the storage devices 38a-38d is controlled through the use of disk adapters 36a-36d which may be implemented using a programmed processor or custom hardware design. In the embodiment illustrated in FIG. 1, a disk adapter is provided for each storage device 38a-38d, although alternatively a disk adapter may be coupled to more than one storage device. In addition, disk adapters may include secondary connections to the storage devices 38a-38d of another disk adapter 36a-36d to permit recovery from failure of one disk adapter by shifting its functions to the second disk adapter.

The storage devices 38a-38d are apportioned into volume sets. One or more of the volume sets may be made available to one or more of the HBA's 45. In one embodiment, references to the data volumes 39a-d of the storage devices 38a-38d by the HBA's are performed using logical unit numbers (LUN's). There need not be a one-to-one correspondence between the logical unit numbers provided by hosts and the physical addresses of the disk devices.

A configuration database 32 (FIG. 1) stores information regarding which ones of the HBA's have access to which ones of the volumes. As discussed above, in one embodiment information in the configuration database is received from the system administrator and is periodically updated as the configuration of the network changes.

An example of the types of data that may be stored in the configuration database 32 include a history table 68. The history table is apportioned into one block for each of the ports of the storage system. Each block in the history table includes a list of those hosts that have queried the port as they entered the network. The identification information for each host may include the WWN name of the host, the source ID of the host, or other aliases of the host. This identification information may be used when the host logs into the storage system to match an identifier of the host with configuration data for the host.

The configuration database 32 may also include a header portion 70 for mapping the HBA's to the available ports at the storage system. A volume allocation portion 72 may be provided for allocating logical volumes of data at the storage system 20 to different HBA's. A mapping portion 74 is provided for mapping LUN's to physical addresses of the disks. In addition, a filter table 76 is provided for controlling which HBA's have access to which of the LUN's. The filter table 76 is generated using the volume allocation and mapping information and includes a record for each HBA coupled any of the ports of the storage system.

An example implementation of the filter table 76 is provided in FIG. 2. Each record 76a-76n includes the WWN associated with the HBA, a flag indicating whether the volumes allocated in this entry are shared, and a LUN map identifying which of the logical volumes the HBA may access. In one embodiment, the LUN map is in the form of a bitmask with one bit allocated to each LUN in the storage system. In one embodiment, a bit in the bitmask is set to indicate that the associated HBA indicated by the WWN has access to the corresponding LUN, although alternatively the bit may be cleared to indicate access. In addition, alternative embodiments wherein the available LUN's are indicated differently may also be used.

Referring again to FIG. 1, the storage system 20 also includes a filter and adapter unit 34, which preferably is a Fibre Channel adapter. The filter and adapter unit 34 translates packets received from the network into data blocks and control for forwarding to the disk adapters 36a-36d. In addition, the filter and adapter unit 34 performs a filtering function to ensure that only those HBA's with privileges are able to access volumes. Moreover, other volumes are not even visible if permissions are not available for accessing them, preventing unauthorized or hacking access. The filter and adapter unit 34 controls accesses to the disks by filtering out non-privileged requests from internet-based computers such as $12$-$12_{i+n}$.

In one embodiment, the filter and adapter unit 34 includes a processor 80 coupled to a memory 83. The processor is used to control the transmission and translation of data between the storage system 20 and the network 21. The memory 83 is used to store a transient filter table 84. The transient filter table is apportioned into a number of tables, one for each port of the storage system. Each time that an HBA initiates a connection with the storage system 20 over one of its ports, filtering information is copied from the filter table 76 in the configuration database 32 to the appropriate entry in the transient filter table 84. The filtering information may include the source ID of the HBA logged into the port, a flag indicating whether the volumes associated with this entry are shared, and a LUN map for the HBA logged into the port, where the LUN map is copied from the filter table 76 in the configuration database.

In one embodiment, the configuration data in the transient filter table 84 is accessed for each request. The address of the request is provided in Bus/Target/LUN format, where the Bus portion indicates the Fibre Channel network address of the storage system 20, the Target portion indicates the storage system port address, and the LUN represents the volume address of the request. The address is compared with the entry in the transient filter table 84, which includes the LUN map associated with the HBA. If the bit in the LUN map associated with the addressed LUN indicates that the HBA has access to the LUN, the request is forwarded to the disk adapters 36a-36d for servicing. If not, the request is ignored.

The size of the transient filter table 84 is related to the number of ports provided at the storage system, the number of HBA's supported at each port and the number of LUN's in the storage system. An example configuration of the storage system 20 may include sixteen ports for accessing 4096 LUN's, with each port capable of supporting accesses by thirty-two different HBA's. Thus, when the transient filter table 84 is large, if it is stored in a single large memory the access time for each I/O request may be long.

The transient filter table 84 may be stored in memory, as illustrated in FIG. 1, or alternatively implemented in hardware. While the configuration of the transient database described above provides one method of accessing HBA mapping information, alternative configurations may also be used. The present invention is not limited to this implementation. Rather, any configuration database arrangement that allows mapping data to be obtained from the database using a source identifier and a resource address may be used. Accordingly, a data management system that reserves volumes of data for host processors based on host identifiers has been described.

Figure 5:
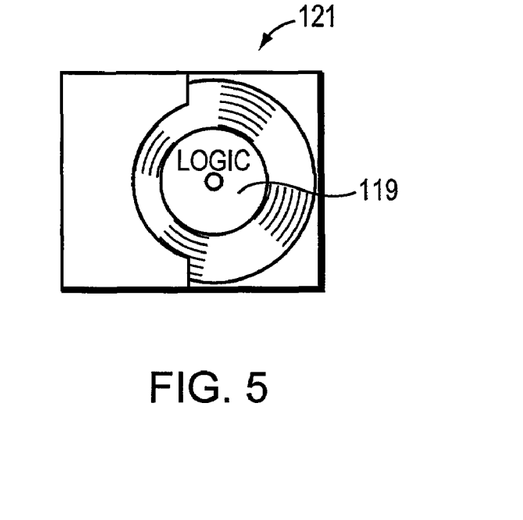
FIG. 5 is an exemplary representation of a computer-readable medium encoded with the logic of FIG. 1 for enabling the method of the present invention.

Logic for carrying out the operation of this invention may be stored in computer memory as shown in FIG. 1 or reside elsewhere including on a computer readable medium 121 as shown in FIG. 5. The Logic may be enabled in a choice of computer program languages as will be apparent to one skilled in the art in view of the description given herein of its operation and configuration.

As shown in FIG. 5, the Logic may be included and enabled to operate from a computer-readable medium such as CD-ROM 121 encoded with Logic 119 that acts in cooperation with normal computer electronic memory as is known in the art. Logic 119 may be configured with all or at least a portion of Logic 31, 49, and 51, each shown in FIG. 1, and Logic 106-107 shown in FIG. 3 for carrying out and enabling the operation of the invention described with reference to FIGS. 1, and 3-4 (described below). Nevertheless, one skilled in the relevant computer-related arts will recognize that the Logic may be implemented interchangeably as hardware or software and may be implemented in various fashions in accordance with the teachings presented herein.

Dynamically Updateable Configuration

To provide an advantage of being able to perform dynamic updates of shared data, such as that comprising web page data over the preferred internet network, FIG. 3 shows a preferred internal and external network configuration including similar systems to those described with reference to FIG. 1 described above. Thus, only general reference is made to describe systems that are either identical or similar to those shown in that Figure.

Referring now to FIG. 3, reference is now made to a data storage network in which the invention is particularly useful and includes a Data Storage System 200, and File Server 104. In a preferred embodiment the data storage system is a Symmetrix Integrated Cache Disk Array available from EMC Corporation of Hopkinton, Mass. similar to data storage system 20 of FIG. 1, but including DVAP Logic 131, which itself is similar to DVAP Logic 31 of FIG. 1.

Generally, in the preferred embodiment the File Server 104 manages the access to the data stored in the Data Storage System 200. Software applications that need concurrent access to the data for multiple users on the external network can communicate with the File Server through industry-standard protocols. Such protocols may include NFS for UNIX world and CIFS for Windows NT (Microsoft Corp., Redmond, Wash.). Applications request data services, the server executes the requests, and sends the results to the applications. All communication between the applications and the server is over the network.

Figure 4:
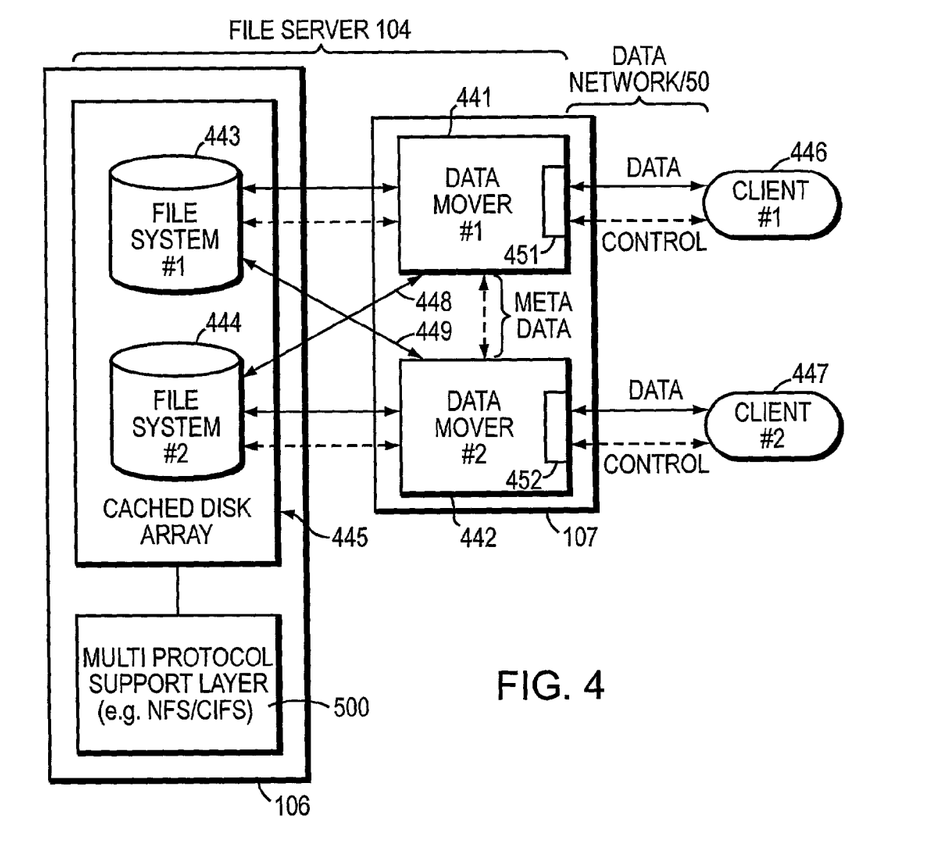
FIG. 4 is a preferred architecture of the file server of FIG. 3.

The system described herein with reference to FIGS. 3-4 is dynamically updateable but has at least the same security advantages of the system of FIG. 1 in addition to those provided by the Logic components of FIG. 3. With regard to other similarities between FIG. 1 and FIG. 3, the host computers of the external network shown in FIG. 3 are identical to those of the external networks of FIG. 1 so they have not been described in detail but they are of course different in the since that they function in a different environment and thus similar numbering is used, e.g. $12_i$ corresponds to $112_i$ and so forth for each such numbered component. The Storage System 200 is similar to the Storage System 20 but some differences have been noted above, and the same is true when comparing Host 111 to Host 11. In general Host 111 includes additional Logic to operate in cooperation with the File Server 104.

Referring to FIG. 3, The File Server 104 using FS-Logic 106 in cooperation with FS-Logic 150 on host 111 allows clients to access files stored in the File Server's format. Data-Moving Logic 107 cooperates with the FS-Logic on the File Server. The Logic 107 and its function is described in detail with reference to FIG. 4. In a preferred embodiment, the File Server 104 is an EMC Celerra available from EMC Corporation of Hopkinton, Mass., and the FS-Logic is EMC High-Road Software, wherein the file format and is offered as part of the HighRoad software platform also available from EMC Corp. of Hopkinton, Mass.

A detailed description of the Celerra server and HighRoad software is given in U.S. Pat. No. 6,324,581 issued Nov. 27, 2001 and assigned to EMC the assignee of the present invention and hereby incorporated by reference herein. A Celerra File Server and HighRoad software is also described in an engineering white paper, dated December 2000 and available on the internet website www.emc.com and entitled "EMC Celerra HighRoad White Paper."

The host 111 interacts with the preferred Celerra HighRoad File Server 104 for control, and management, but performs data transfers directly to and from the storage devices 138a-d on Symmetrix including Data Storage Volumes 139a-d. HighRoad interoperates with standard file management protocols, e.g. NFS and CFS but supplies the host 111 with HighRoad's file mapping protocol (FMP) for file layout information and conflicts management (i.e. file locking).

When an application on the host 111 needs data, or the external host $112_i$ requests data for itself or its clients computers $12_{i+1}$-$12_{i+n}$, a request is sent for data that is received by the FS-Logic or HighRoad software component 50 on the client host 111. That component of the HighRoad software sends a request for metadata to FS-Logic 106, which is part of HighRoad software on the File Server 104. The term metadata refers to information about the data, and the term metadata is inclusive of file access information and file attributes. The file access information includes the locks upon the files or blocks of data in the files. The file attributes include pointers to where the data is stored in the cached disk array.

In response to a metadata request, a data mover (FIG. 4) owning the file system accesses file access information and file attributes in a fashion similar to the processing of a file access request, but if the file access request is a read or write request, then the data mover owning the file does not read or write data to the file. Instead of reading or writing data, the data mover owning the file system places any required lock on the file, and returns metadata including pointers to data in the file system to be accessed.

The component on the file server sends the metadata that includes a location of the file and a file access lock to the HighRoad software on the client host, which passes it to the client. Now the host 111 can access the file directly over its own disk channel at high speed. The host 111 hands off a small amount of metadata to the client, which uses the provided FMP and file locking rights to manage its own data operations on the data storage system, but under security control of the DVAP Logic 131.

A client is permitted to send data access commands directly to network data storage of a network file server after obtaining a lock on at least a portion of the file and obtaining metadata indicating storage locations for the data in the data storage. For example, the client sends to the file server at least one request for access to a file. In response, the file server grants a lock to the client, and returns to the client metadata of the file including information specifying data storage locations in the network data storage for storing data of the file. The client receives the metadata, and uses the metadata to produce at least one data access command for accessing the data storage locations in the network storage. The client sends the data access command to the network data storage to read or write data to the file. For a write operation, the client may modify the metadata. When the client is finished writing to the file, the client returns any modified metadata to the file server.

The network file server architecture of FIG. 4 allows file sharing among heterogeneous clients, and supports multiple file access protocols concurrently but with security provided for internet access of data as described above. The architecture permits clients using traditional file access protocols to inter-operate with clients using the new distributed locking and metadata management protocol for direct data access at the channel speed of the data storage devices. This provides a scaleable solution for full file system functionality for coexisting large and small files.

Referring to FIG. 4, file server 104 includes at least two data movers 441, 442 that access at least two file systems 443, 444 in storage of a cache disk array 445. The first data mover 441 owns the file system 443, and the second data mover 442 owns the second file system 444. The file server 104 is linked by a data network 450 to a plurality of client applications 446, 447, each being managed by Host computer 111. The first data mover 441 has a network port 451 for receiving file access requests from at least one client 446, and the second data mover 42 has a network port 452 for receiving file access requests from at least one other client 447.

Referring again to FIG. 4, the FS-Logic 106 includes a multiprotocol support layer 500 such that requests for data in a filesystem other than the filesystem of the file server, such as NFS or CIFS are supported. One skilled in the art will recognize that any aspect of the FS-Logic 106 can also be performed by complementary FS-Logic 150 on Host 111 by choosing where to allocate and operate program code for such functionality. Thus, although not shown diagrammatically for the sake of simplicity, the multi-protocol support layer 500 may also be included as part of FS-Logic 150.

The network file server architecture in FIG. 4 includes a data bypass path 448 between the first data mover 441 and the second file system 444 in order to bypass the second data mover 442, and a data bypass path 449 between the second data mover 442 and the first file system 443 in order to bypass the first data mover 441. It is possible for each of the data movers 441, 442 to access data in each of the file systems 443, 444, but if a data mover does not own the file access information for the file system to be accessed, then the data mover should ask the owner for permission to access the file system, or else a data consistency problem may arise.

For example, when the first data mover 441 receives a file access request from its client 446, it accesses its directory of file ownership information to determine whether or not it owns the file system to be accessed. If the first data mover 441 does not own the file system to be accessed, then the first data mover 441 sends a metadata request to the data mover that owns the file system to be accessed. For example, if the first client 446 requests access to the second file system 444, then the first data mover 441 sends a metadata request to the second data mover 442.

The term metadata refers to information about the data, and the term metadata is inclusive of file access information and file attributes. The file access information includes the locks upon the files or blocks of data in the files. The file attributes include pointers to where the data is stored in the cached disk array. The communication of metadata between the data movers 441, 442 is designated by the dotted line interconnection in FIG. 4.

In response to a metadata request, the data mover owning the file system accesses file access information and file attributes in a fashion similar to the processing of a file access request, but if the file access request is a read or write request, then the data mover owning the file does not read or write data to the file. Instead of reading or writing data, the data mover owning the file system places any required lock on the file, and returns metadata including pointers to data in the file system to be accessed. For example, once the first data mover 441 receives the pointers to the data to be accessed in the second file system 444, then the first data mover communicates read or write data over the bypass path 448. For a read operation, the first data mover 441 sends a read command over the data bypass path 448 to the file system 444. In response, read data from the file system 444 is returned over the data bypass path 448, and the first data mover 441 forwards the read data to the first client 446. For a write operation, the first data mover 441 receives write data from the first client, and forwards the write data over the data bypass path 448 to be written in the second file system 444. The first data mover 441 transmits the write data in a write command including the pointers from the metadata received from the second data mover 442.

If a write operation changes any of the file attributes, then the new file attributes are written from the first data mover 441 to the second data mover, and after the write data is committed to the second file system 444, the second data mover 442 commits any new file attributes by writing the new file attributes to the file system. As described in the above-referenced Vahalia et al., U.S. Ser. No. 09/261,542 issued Mar. 3, 1999 [Ser. No. 08/747,631 filed Nov. 13, 1996], a data security problem is avoided by writing any new file attributes to storage after the data are written to storage. If the network communication protocol supports asynchronous writes, it is possible for a data mover that does not own a file system to cache read or write data, but in this case any data written to the cache should be written down to the nonvolatile storage of the file system and the cache invalidated just prior to releasing the lock upon the file system. Otherwise, data in the cache of a data mover that does not own a file system may become inconsistent with current data in the file system or in a cache of another data mover.

An Example of Operation of the Invention

Now for a better understanding of the operation of this invention, following is an example of operation of a dynamically updateable configuration with volume access security in place as described with reference to FIG. 3: Assume for the sake of this example, an internal server (IS) may update an interactive webpage. Meanwhile, there may be 2 external servers (ES1 and ES2) that are hosting that webpage. Assuming that IS has read/write permission to volumes 1, 2, and 3. ES1 has read permission to volume 1 and write only permission for volume 2. ES2 has read permission for volume 1 and write only permission for volume 3.

1) IS writes out the web page.
2) ES1 connects to the web page. Client 1 sees what IS wrote out and enters some data, which ES1 writes to volume 2.
3) ES2 connects to the web page. Client 2 sees what IS wrote out and enters some data, which ES2 writes to volume 3.
4) IS changes the web page.
5) The preferred HighRoad file system invalidates any modified extents in ES1 and ES2.
6) Client 3 on ES1 connects to the web page. ES1 re-reads the missing extents, showing client 3 a consistent view of the page.
7) Assume that Client 4 on ES2 is under control of an unauthorized intruder or hacker.

Assume that the hacker successfully breaks into ES2 and gets root access. But if the hacker tries to give Client 4 write access to volume 1 that would fail because ES2 has no control over volume permissions. Even if the file system on ES2 is hacked to indicate that Client 4 has write permissions, any writes that get issued by the server will be rejected by the preferred Symmetrix. The hacker may be able to crash ES2 or other clients, but will not be able to affect the actual web page or data that has been written by other servers. The hacker is effectively contained.

8) Client 5 connects on ES1 and is completely isolated from and unaffected by the presence of the hacker on ES2.

A system and method has been described for managing secure access to data stored in a data storage system when access is made available over an external network, such as the internet. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage network having a data storage system with memory and one or more data storage devices storing data arranged as one or more data volumes, the one or more data storage devices located at a first location, the data storage system comprising a secure database secured from unauthorized access located at a second location exclusive of the first location, hereinafter denominated as the secure database and wherein the data storage system is in communication with a computer system also having memory, a method for using computer-executable logic for managing secure access to the data by a plurality of hosts, wherein the plurality of host are coupled to the data storage network by an Internet Protocol (IP) network and the data storage system accesses the data via a first path, and wherein the method includes:

allocating permissions for controlling accesses to the one or more data volumes stored on the one or more data storage devices;

in response to each receipt of a connection initiation request by a host of the plurality of hosts over the IP network, copying permissions associated with the hosts from the secure database, wherein being secured from unauthorized access includes being secured from access by the hosts, via a second path to a transient database of the data storage system, wherein the transient database comprises a transient filter table, wherein the transient filter table comprises a record copied from the secure database for each host of the plurality of hosts coupled to each port of a plurality of ports of the storage system, and wherein each of the records stores the permissions for each of the plurality of hosts that accesses the data storage system through the port of the plurality of ports;

for each request to access a file that is received via the IP network at each port of the plurality of ports of the data storage system, accessing the transient filter table to determine whether the host of the plurality of hosts that initiated the request to access the file has the permission to access the one or more data volumes associated with the file, wherein the transient filter table contains for each host of the plurality of hosts for each port of the plurality of ports, a bitmap identifying the host permissions for each of the one or more data volumes.

2. The method of claim 1, wherein the plurality of hosts share read-write access to the file, with granted respective read locks and write locks on the file.

3. The method of claim 1, wherein the computer system is a file server in communication with the data storage system, and the method further comprises:

(a) the file server receiving from a computer external to the data storage network, a request for accessing data related to the file;

(b) in response to the request for accessing data, the file server returning to the computer external to the data storage network metadata of the file including information specifying a data storage location for the file; and (c) using the metadata of the file, the computer external to the data storage network producing at least one data access command for accessing the data storage location by forwarding the at least one data access command to a port of the plurality of ports of the data storage system over the IP network, whereby such the data access command is managed by determining, using the transient filter table, whether the computer external to the data storage network has the permissions which will allow the external computer such access.

4. The method of claim 3, wherein a plurality of externally located computers share read-write access to the file, with granted respective read locks and write locks on the file.

5. The method of claim 3, wherein the computer external to the data storage network writes data to the data storage location, if the permissions allow the computer external to the data storage to write the data to the data storage location, and modifies the metadata from the file server in accordance with the data storage location to which the data is written, and sends the modified metadata to the file server.

6. The method of claim 5 wherein the computer external to the data storage network sends the modified metadata to the file server after the computer external to the data storage network writes the data to the data storage location.

7. A system for managing access to data that can be dynamically updated for computers on an Internet Protocol (IP) network externally located to a data storage network, the system comprising:

a data storage network including a data storage system with memory and one or more data storage devices storing data in one or more data volumes, the one or more data storage devices located at a first location and the data storage system accessing the data via a first path, and a computer system also having memory and a secure database secured from unauthorized access located at a second location exclusive of the first location, hereinafter denominated as the secure database; and computer-executable program code stored in the memory of the computer system to perform:

allocating permissions for controlling accesses to the one or more data volumes stored on the one or more data storage devices;

in response to each receipt of a connection initiation request by a host over the IP network, copying permissions associated with the host from the secure database, wherein being secured from unauthorized access includes being secured from access by the hosts, via a second path to a transient database of the data storage system, wherein the transient database comprises a transient filter table, wherein the transient filter table comprises a record for each host coupled to each port of a plurality of ports of the storage system, and wherein each record of a plurality of records stores the permission for each host of the plurality of hosts that accesses the data storage system through the port of the plurality of ports;

for each request to access a file that is received via the IP network at each port of the plurality of ports of the data storage system, accessing the transient filter table to determine whether the host that initiated the respective request to access the file has the permission to access the one or more data volumes associated with the file, wherein the transient filter table stores, for each host of the plurality of hosts for each port of the plurality of ports, a bitmap identifying the host permissions for each of the one or more data volumes.

8. The system of claim 7, wherein a plurality of externally located computers share read-write access to the file, with granted respective read locks and write locks on the file.

9. The system of claim 7, wherein the computer system is a file server in communication with the data storage system, and the system further comprises:

(a) the file server receiving from a computer external to the data storage network, a request for accessing data related to the file;

(b) in response to the request for accessing data, the file server returning to the computer external to the data storage network metadata of the file including information specifying a data storage location for the file; and (c) using the metadata of the file, the computer external to the data storage network producing at least one data access command for accessing the data storage location and forwarding the at least one data access command via the IP network to a port of the plurality of ports of the data storage network, whereby such the data access command is managed by accessing the transient database using an identifier of the computer external to the data storage network and a port number associated with the port to determine whether the computer external to the data storage network has the permissions which will allow the external computer such access.

10. The system of claim 9, wherein a plurality of externally located computers share read-write access to the file, with granted respective read locks and write locks on the file.

11. The system of claim 9, wherein the computer external to the data storage network writes data to the data storage location, if the permissions allow the computer external to the data storage to write the data to the data storage location, and modifies the metadata from the file server in accordance with the data storage location to which the data is written, and sends the modified metadata to the file server.

12. The system of claim 11, wherein the computer external to the data storage network sends the modified metadata to the file server after the computer external to the data storage network writes the data to the data storage location.

13. A program product for managing access to data in a data storage network, wherein the data storage network includes a data storage system having memory, and a secure database secured from unauthorized access, hereinafter denominated as the secure database and one or more data storage devices storing data in one or more data volumes, wherein the data storage devices are located in a first location and the data on the data storage devices is accessed via a first path, wherein the secure database is located in a second location exclusive of the first location and the secure database is accessed via a second path, and a computer system also having memory, the program product comprising:

computer-executable program code stored on a memory of the computer system to perform:

allocating permissions for controlling accesses to the one or more data volumes stored on the one or more data storage devices;

in response to receipt of a connection initiation request by a host over an Internet Protocol (IP) network, copying permissions associated with the host from the secure database, wherein being secured from unauthorized access includes being secured from access by a plurality of hosts, to a transient database using the second path, of the data storage system, wherein the transient database comprises a transient filter table, wherein the transient filter table comprises a record for each host of the plurality of hosts coupled to each port of a plurality of ports of the storage system, and wherein each of the records stores the permission for each host of the plurality of hosts that accesses the data storage system through the port of the plurality of ports;

for each request to access a file that is received at each port of the plurality of ports of the data storage system via the IP network, accessing the transient filter table to determine whether the host of the plurality of hosts that initiated the respective request to access the file has the permission to access the one or more data volumes associated with the file, wherein the transient filter table stores, for each host of the plurality of hosts for each port of the plurality of ports, a bitmap identifying the host permissions for each of the one or more data volumes.

14. The program product of claim 13, wherein the IP network externally located to the data storage network operates in accordance with an internet protocol of the IP network.

15. The program product of claim 14, wherein a plurality of externally located computers share read-write access to the file, with granted respective read locks and write locks on the file.

16. The program product of claim 13, wherein the computer system is a file server in communication with the data storage system, and the program product further comprises:

(a) the file server receiving from a computer external to the data storage network, a request for accessing data related to the file;

(b) in response to the request for accessing data, the file server returning to the computer external to the data storage network metadata of the file including information specifying a data storage location for the file; and (c) using the metadata of the file, the computer external to the data storage network producing at least one data access command for accessing the data storage location and forwarding the at least one data access command via the IP network to a port of the plurality of ports of the data storage system, whereby such the data access command is managed by accessing the transient database using an identifier of the computer external to the data storage network and a port number associated with the port to determine whether the computer external to the data storage network has the permissions which will allow the external computer such access.

17. The system program of claim 16, wherein the IP network externally located to the data storage network operates in accordance with an internet protocol of the IP network.

18. The program product of claim 17, wherein a plurality of externally located computers share read-write access to the file, with granted respective read locks and write locks on the file.

19. The program product of claim 16, wherein the computer external to the data storage network writes data to the data storage location, if the permissions allow the computer external to the data storage to write the data to the data storage location, and modifies the metadata from the file server in accordance with the data storage location to which the data is written, and sends the modified metadata to the file server.

20. The program product of claim 19, wherein the computer external to the data storage network sends the modified metadata to the file server after the computer external to the data storage network writes the data to the data storage location.

21. An apparatus for managing access to data that can be dynamically updated for computers on an Internet Protocol (IP) network externally located to a data storage network, wherein the data storage network includes a data storage system having memory and one or more data storage devices storing the data in one or more data volumes, wherein the data storage devices are located in a first location and the data on the data storage devices is accessed via a first path, a secure database secured from unauthorized access located in a second location exclusive of the first location, hereinafter denominated as the secure database, where the secure database is accessed via a second path, and the data storage network also includes a computer system that has memory, the apparatus comprising:

a memory; and a processor to perform:

allocating permissions for controlling accesses to the one or more data volumes stored on the one or more data storage devices;

in response to receipt of a connection initiation request by a host over the IP network, copying permissions associated with the host from the secure database, wherein being secured from unauthorized access includes being secured from access by a plurality of hosts, to a transient database of the data storage system using the second path, wherein the transient database comprises a transient filter table, wherein the transient filter table comprises a record for each host of the plurality of hosts coupled to each port of a plurality of ports of the storage system, and wherein each of the records stores the permission for each host of the plurality of hosts that accesses the data storage system through the port of the plurality of ports;

for each request to access a file that is received via the IP network at each port of the plurality of ports of the data storage system, accessing the transient filter table to determine whether the host that initiated the respective request to access the file has the permission to access the one or more data volumes associated with the file, wherein the transient filter table stores, for each host of the plurality of hosts for each port of the plurality of ports, a bitmap identifying the host permissions for each of the one or more data volumes.

22. The method of claim 1 further including:

employing encrypted keys to authenticate that the connection initiation request from a host of the plurality of hosts actually corresponds to a request by said host of the plurality of hosts.

23. The system of claim 7 further including:

employing encrypted keys to authenticate that the connection initiation request from a host of the plurality of hosts actually corresponds to a request by said host of the plurality of hosts.

24. The program product of claim 13 further comprising:

employing encrypted keys to authenticate that the connection initiation request from a host of the plurality of hosts actually corresponds to a request by said host of the plurality of hosts.

25. The apparatus of claim 21 further including:

employing encrypted keys to authenticate that the connection initiation request from a host of the plurality of hosts actually corresponds to a request by said host of the plurality of hosts.

* * * * *